US011109010B2

(12) United States Patent
Nevins

(10) Patent No.: US 11,109,010 B2
(45) Date of Patent: Aug. 31, 2021

(54) AUTOMATIC SYSTEM FOR PRODUCTION-GRADE STEREO IMAGE ENHANCEMENTS

(71) Applicant: The United States of America As Represented By The Director Of The National Geospatial-Intelligence Agency, Springfield, VA (US)

(72) Inventor: Robert Nevins, Saint Louis, MO (US)

(73) Assignee: The United States of America As Represented By The Director Of The National Geospatial-Intelligence Agency, Springfield, VA (US)

( * ) Notice: Subject to any disclaimer, the term of this patent is extended or adjusted under 35 U.S.C. 154(b) by 0 days.

(21) Appl. No.: 16/822,737

(22) Filed: Mar. 18, 2020

(65) Prior Publication Data

US 2020/0413024 A1 Dec. 31, 2020

Related U.S. Application Data

(60) Provisional application No. 62/868,226, filed on Jun. 28, 2019.

(51) Int. Cl.
*H04N 13/133* (2018.01)
*H04N 13/15* (2018.01)
*G06T 5/00* (2006.01)
*H04N 13/00* (2018.01)

(52) U.S. Cl.
CPC ........... *H04N 13/133* (2018.05); *G06T 5/009* (2013.01); *H04N 13/15* (2018.05); *H04N 2013/0077* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,369,595 | B1 * | 2/2013 | Derakhshani | G06K 9/0061 382/128 |
| 8,508,580 | B2 * | 8/2013 | McNamer | H04N 13/221 348/43 |
| 9,300,947 | B2 * | 3/2016 | Park | H04N 13/211 |
| 9,380,292 | B2 * | 6/2016 | McNamer | H04N 13/261 |
| 9,386,291 | B2 * | 7/2016 | Tomioka | H04N 13/106 |

(Continued)

OTHER PUBLICATIONS

Grodecki, Jacek and Gene Dial. "IKONOS geometric accuracy." Proceedings of joint workshop of ISPRS working groups 1/2, 1/5 and IV/7 on high resolution mapping from space. vol. 4. 2001.

(Continued)

*Primary Examiner* — Brian P Yenke
(74) *Attorney, Agent, or Firm* — Joseph Fleishman

(57) ABSTRACT

Systems and methods for automatically optimizing pairs of stereo images are presented. Pixels in an image pair are reprojected from their raw format to a common pixel-space coordinate system. The image pair is masked to remove pixels that do not appear in both images. Each image undergoes a local enhancement process. The local enhancements are processed into a global enhancement for each image of the image pair. A factor is calculated to balance the left and right images with each other. A brightness factor for the image pair is calculated. The enhancements, including the balancing and brightness factors, are then mapped to their respective images.

20 Claims, 3 Drawing Sheets

(56) References Cited

U.S. PATENT DOCUMENTS

| | | | | |
|---|---|---|---|---|
| 9,773,301 | B2* | 9/2017 | Olsen | G06T 5/009 |
| 9,860,494 | B2* | 1/2018 | Johnson | H04N 21/4122 |
| 10,008,027 | B1* | 6/2018 | Baker | G06T 7/50 |
| 10,013,764 | B2* | 7/2018 | Atanassov | G06T 7/593 |
| 10,051,259 | B2* | 8/2018 | Ha | G06T 7/529 |
| 10,410,531 | B2* | 9/2019 | Cross | B64D 47/08 |
| 10,455,219 | B2* | 10/2019 | Cohen | H04N 13/271 |
| 10,554,956 | B2* | 2/2020 | Das | H04N 13/204 |
| 10,762,392 | B2* | 9/2020 | Zhang | G06N 3/063 |
| 10,839,535 | B2* | 11/2020 | Javidnia | G06K 9/6215 |
| 10,915,996 | B2* | 2/2021 | Lin | G06T 5/003 |
| 2005/0089213 | A1* | 4/2005 | Geng | G06K 9/00214 |
| | | | | 382/154 |
| 2008/0123937 | A1* | 5/2008 | Arias Estrada | G06T 7/593 |
| | | | | 382/154 |
| 2011/0032341 | A1* | 2/2011 | Ignatov | H04N 13/144 |
| | | | | 348/51 |
| 2013/0002814 | A1* | 1/2013 | Park | H04N 13/122 |
| | | | | 348/43 |
| 2014/0198976 | A1* | 7/2014 | Coffman | G06T 7/593 |
| | | | | 382/154 |
| 2014/0313423 | A1* | 10/2014 | Johnson | G03B 21/13 |
| | | | | 348/745 |
| 2016/0028967 | A1* | 1/2016 | Sezer | H04N 5/23296 |
| | | | | 348/240.2 |
| 2016/0035073 | A1* | 2/2016 | Park | G06K 9/6212 |
| | | | | 382/170 |
| 2017/0221186 | A1* | 8/2017 | Glotzbach | G06T 7/90 |
| 2017/0228867 | A1* | 8/2017 | Baruch | G06K 9/00362 |
| 2018/0302614 | A1* | 10/2018 | Toksvig | G06T 19/00 |
| 2019/0035363 | A1* | 1/2019 | Schluessler | G09G 3/003 |
| 2019/0221026 | A1* | 7/2019 | Tytgat | G06T 15/04 |
| 2019/0304164 | A1* | 10/2019 | Zhang | G06T 15/08 |
| 2019/0325580 | A1* | 10/2019 | Lukac | G06T 7/12 |
| 2019/0333237 | A1* | 10/2019 | Javidnia | G06T 3/4007 |
| 2019/0362511 | A1* | 11/2019 | Jouppi | G06T 5/50 |
| 2020/0143554 | A1* | 5/2020 | Toldo | G06T 7/521 |
| 2020/0162719 | A1* | 5/2020 | Tadi | H04N 13/257 |
| 2020/0177870 | A1* | 6/2020 | Tadi | G02B 27/0172 |
| 2020/0334842 | A1* | 10/2020 | Michielin | G06T 15/10 |
| 2020/0349754 | A1* | 11/2020 | Michielin | G06T 3/0093 |
| 2020/0396370 | A1* | 12/2020 | Zhen | G06T 5/50 |
| 2021/0004933 | A1* | 1/2021 | Wong | G06T 7/248 |
| 2021/0042897 | A1* | 2/2021 | Tong | G06T 7/20 |
| 2021/0134064 | A1* | 5/2021 | Shahrokni | G06T 3/40 |

OTHER PUBLICATIONS

Grodecki, Jacek and Gene Dial. "Block adjustment of high-resolution satellite images described by rational polynomials." Photogrammetric Engineering & Remote Sensing 69.1 (2003): 59-68.

Document previously listed (Cuba, Laurence and Charles Nichols) is for internal Government use only and will not be published.

Zuiderveld, Karel. "Contrast limited adaptive histogram equalization." Graphics gems IV. Academic Press Professional, Inc., 1994.

Min, Byong Seok, et al. "A novel method of determining parameters of CLAHE based on image entropy." International Journal of Software Engineering and Its Applications 7.5 (2013): 113-120.

Jiang, Xiaoqian, et al. "Smooth isotonic regression: A new method to calibrate predictive models." AMIA Summits on Translational Science Proceedings 2011 (2011): 16.

Kim, T. and Yang, H.S., 2006, "A Multidimensional Histogram Equalization by Fitting an Isotropic Gaussian Mixture to Uniform Distribution," International Conference on Image Processing, Atlanta, USA.

\* cited by examiner

AUTOMATIC SYSTEM FOR PRODUCTION-GRADE STEREO IMAGE ENHANCEMENTS

STATEMENT OF GOVERNMENT INTEREST

The invention described herein was made by employees of the United States Government and may be manufactured and used by or for the Government for Government purposes without payment of any royalties.

BACKGROUND

Stereo vision systems are widely used to give the appearance of 3D images using a pair of 2D images. However, in order to provide an optimal 3D image, the pair of 2D images must be adjusted to account for differences between the two images of the pair. The adjustment process can be very cumbersome, particularly if multiple images are being used, such as in 3D stereo video.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

The present application is directed to systems and methods for automatically optimizing pairs of stereo images. Pixels in an image pair are reprojected from their raw format to a common pixel-space coordinate system. The image pair is masked to remove pixels that do not appear in both images. Each image undergoes a local enhancement process. The local enhancements are processed into a global enhancement for each image of the image pair. A factor is calculated to balance the left and right images with each other. A brightness factor for the image pair is calculated. The enhancements, including the balancing and brightness factors, are then mapped to their respective images.

The systems and methods disclosed in the present application can be used to automate the process of enhancing stereo image pairs and/or, enable real-time or near-real-time viewing of stereo images and/or video.

In at least one embodiment, a left image and a right image of a stereo image pair are captured at different times.

In at least one embodiment, a left image and a right image of a stereo image pair are captured using image capture devices with different characteristics.

In at least one embodiment, a plurality of images comprising a stereo image pair are at least one of color, multispectral, hyperspectral, thermal, infrared, or overhead persistent infrared (OPIR) images.

In at least one embodiment, a plurality of stereo image pairs are received, processed, and displayed in real-time or near-real-time.

Many of the attendant features will be more readily appreciated by reference to the following detailed description and the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Further, various illustrated or described portions of processes may be re-ordered or executed in parallel in various different embodiments.

Although a particular example may be described and illustrated herein as comprising a Digital Point Positioning Database (DPPDB), the examples are provided as an example and not a limitation. As those skilled in the art will appreciate, any of the examples may be implemented with or without a DPPDB or any other type or format of stereo image pairs.

As used herein, the term "stereo image pair" refers to a plurality of images in which at least some portion of two or more images contain the same subject matter (terrain, person, or other object). All or some of the plurality of images may have been captured simultaneously or at different points in time. In addition, all or some of the plurality of images may have been captured by the same or different image capture devices.

As used herein, the terms "left image" and "right image" refer to one or the other of the two images that may comprise the enhanced stereo image and may refer to the images before or after enhancements are applied. In embodiments where all images are not enhanced, as discussed further below, the terms may refer to images that will not have enhancements applied.

Further, although some of the examples provided may not contain features described with regard to another example, such a description is provided as an example and not a limitation. As those skilled in the art will appreciate, any of the features associated with an example may be incorporated into any other example provided without departing from the scope of the disclosure.

At least one embodiment of the present application is directed to systems and methods for enhancing one or more stereo image pairs.

Figure 1:
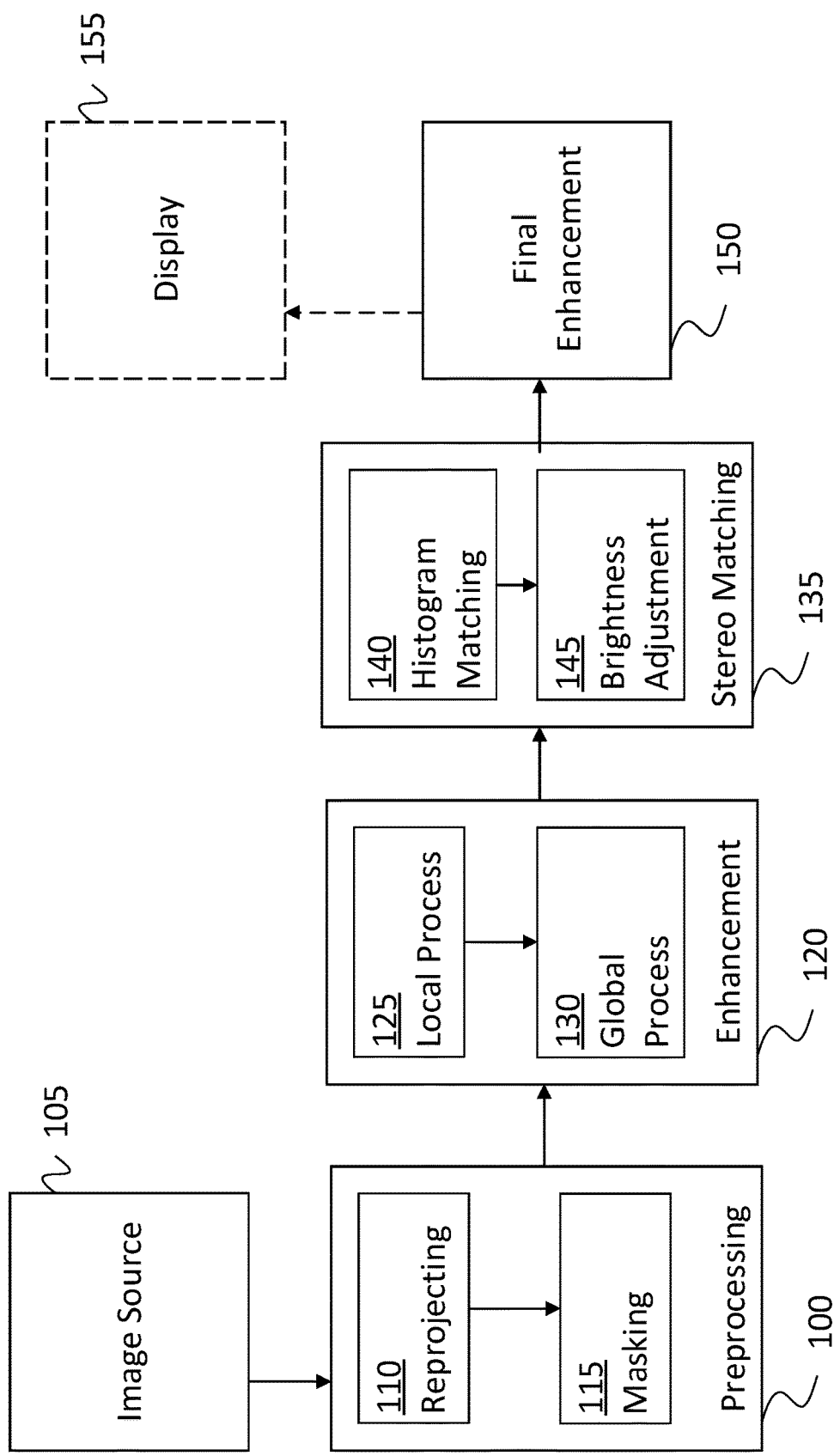
FIG. 1 is a flow chart of a method of calculating and applying image enhancements.

FIG. 1 is a flow chart of a method of calculating and applying image enhancements. Preprocessing 100 comprises receiving a stereo image pair from an image source 105, reprojecting 110 the pixels of the stereo image pair to a common pixel-space coordinate system, and masking 115 the stereo image pair to remove pixels that do not appear in both images. The enhancement process 120 comprises calculating 125 a set of local enhancements and then processing 130 the set of local enhancements into a global enhancement for each image of the stereo image pair. Stereo matching 135 comprises balancing a left image and a right image of the stereo image pair for visual consistency through histogram matching 140 and calculating 145 a brightness adjustment for the stereo image pair. Final enhancement 150 comprises applying enhancement values to the appropriate pixels of the stereo image pair. The enhanced stereo image pair may optionally be displayed 155 to a user. In addition, or alternatively, the enhancement values and/or the enhanced stereo image pair may be stored.

The image source 105 may be a database storing images or one or more image capture devices providing image pairs in real-time or near-real-time. In some embodiments, the image source 105 may comprise two physically separate image capture devices capturing images of the same subject matter and transmitting those images to central location for enhancement.

In some embodiments, a stereo image pair may comprise a plurality of images captured at different times and/or captured by image capture devices with different characteristics. By way of example only and without limiting the scope of the invention, a stereo image pair may comprise a plurality of satellite images of a geographic area that are captured by the same satellite on different passes over the geographic area.

In embodiments where a stereo image pair comprises images captured at different times, change detection techniques, as known in the art, may be used to identify portions of an image that have changed substantially. That is, changes that are beyond those that would be expected from a change in camera angle, illumination, or other similar factors that would affect a large number of pixels. In these embodiments, pixels of a left image and a right image of the stereo image pair that correspond to the portions that have changed substantially may be masked, as discussed below, or they may be excluded from the enhancement process and displayed 155 to a user as un-enhanced pixels.

Those skilled in the art will appreciate that the steps of FIG. 1 may be executed by systems that are co-located with the image source 105, by cloud-based systems, by systems that are geographically separate from the image source 105, or by any combination of the foregoing.

Reprojection 110 comprises converting the pixel locations of a left and a right image of a stereo image pair from two separate coordinate systems local to each of the two images into a single coordinate system that is common to both of the two images. Some stereo image pairs may have associated metadata that defines the physical relationship between the two images. That physical relationship may be used to locate pixels from both images in a common coordinate system using techniques known in the art. Some images may also have associated metadata that defines a relationship between pixel locations and some universal coordinate system, such as latitude, longitude, and elevation. Other computer visions techniques may be used to locate pixels in a common coordinate system or to compensate for missing metadata, as known in the art.

In addition to the methods discussed above, in the case of overhead imagery, reprojection may be done using rational polynomial coefficients (RPCs) and elevation data for the geographic location of the imagery. Used together, RPC data and elevation data allow an image pair to be projected in a common coordinate system onto a topographic surface of the earth, and adjusted accordingly in the pixel-space of the left and right stereo images. RPCs are commonly used in the art to describe the relationship between object-space coordinates (latitude, longitude, and height) and image-space coordinates (X and Y pixels). RPCs can be calculated in a common 78-parameter format for standardized use. These parameters (in vectors c, d, e, and f below) are calculated using an optimal fitting to a physical sensor model of the associated image capture device, and can be represented by:

$c = [c_1\ c_2\ \ldots\ c_{20}]^T$
$d = [1\ d_2\ \ldots\ d_{20}]^T$
$e = [e_1\ e_2\ \ldots\ e_{20}]^T$
$f = [1\ f_2\ \ldots\ f_{20}]^T$ after which the image pixel coordinates can be reprojected by the equations:

$$X = \frac{e^T u}{f^T u}$$

$$Y = \frac{c^T u}{d^T u}$$

where X and Y are the resulting image-space coordinates, and
$u = [1\ L\ P\ H\ LP\ LH\ PH\ L^2\ P^2\ H^2\ PLH\ L^3\ LP^2\ LH^2\ L^2P\ P^3\ PH^2\ L^2H\ P^2H\ H^3]^T$ where P, L, and H are the normalized object-space latitude, longitude, and height respectively.

In some embodiments, reprojection 110 is performed using orthorectified images. Orthorectification, as is known in the art, may be performed before or after an image is received from an image source 105.

Figure 2:
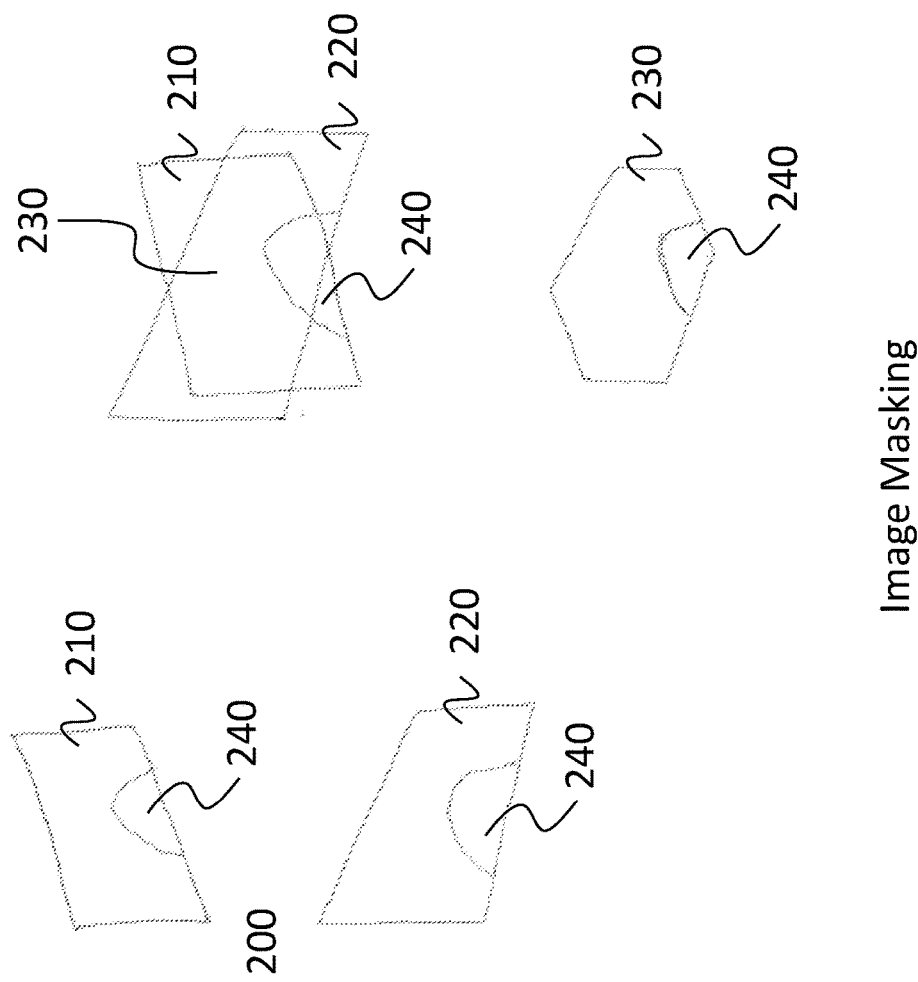
FIG. 2 is an illustration of masking applied to a reprojected image pair.

FIG. 2 is an illustration of masking 115 applied to a reprojected image pair 200. Once a left image 210 and a right image 220 are in the same coordinate system, pixels exclusive to either the left image 210 or the right image 220 are eliminated, so that only pixels common to both the left and right images 230 remain. This method of masking accounts for differences in geometries of the left image 210 and right image 220 that may result from how the images were captured or the devices used to capture them.

Masking can also be used to mitigate negative effects of attempting to enhance images containing highly reflective surfaces 240 such as water. The difference in angle between left and right images can create wide variation in optical properties due to glare from the sun and other light sources reflected from highly reflective surfaces. Highly reflective surfaces 240 can be identified in the image pair 200 manually or by referencing a database or other information source that associates one or more highly reflective surfaces 240 with the coordinate system of the reprojected image pair 200.

In one embodiment, a reprojected image pair may include portions of a body of water. If the image pair is reprojected to latitude and longitude and the coastline of the body of water is mapped in latitude and longitude, the pixels comprising the body of water can be removed from the image pair by removing the pixels that fall within the boundary of the coastline.

Although FIG. 1 shows the enhancement process 120 after masking 115, it should be noted that portions of the enhancement process may begin prior to completion of the full masking process. That is, some steps of the enhancement process may begin before all steps of the masking process are complete and/or the enhancement process may be conducted for portions of an image pair while other portions of the image pair are undergoing the masking process.

Calculating 125 the local enhancements comprises performing contrast limited adaptive histogram equalization (CLAHE) on a left and right image separately, as is known in the art. CLAHE is an improvement over traditional histogram equalization, which is a popular image enhancement technique. In histogram equalization, pixel values are stretched across the entire dynamic range of an image, as evenly as possible. For an 8-bit image, for example, there are $2^8=256$ possible brightness values that a pixel can be assigned, ranging from 0 (black) to 255 (white). Histogram equalization maps input image pixels to output pixels according to the conditions that 1: the output pixels are spread across all 256 brightness values as evenly as possible, and 2: that if any two pixels in the input image have the same brightness value, they will have the same output brightness value as well.

Histogram equalization can be an effective enhancement technique, but it has a significant drawback that, since the image is stretched across the entire dynamic range, the contrast of the resulting image can be too high for comfortable viewing and interpretation. CLAHE addresses this issue by dividing an input image into a number of smaller subregions. Histogram equalization is then performed on each subregion separately, while enforcing a threshold on the maximum contrast that each subregion of the output image can have. This contrast limitation is achieved through an adjustable parameter known as a clip limit, which sets a threshold on how large any peaks in the histogram can be.

In some embodiments with a normalized histogram a clip limit may be set to 0.01, where bin values range from 0 to 1.

In alternative embodiments, a clip limit may be adaptively adjusted, as is known in the art.

In alternative embodiments, contrast may be limited by normalizing the variance of an image according to the equation:

$$O \propto \sqrt[2]{D} * \frac{(I - \mu(I))}{\sigma(I)} + \mu(I)$$

where O is the resulting variance-normalized image, I is the input image, D is the bit depth of the imagery, and $\mu$ and $\sigma$ are the mean and standard deviation, respectively. In some embodiments, the standard deviation of the image may be adjusted proportionally to the square root of the bit depth.

Processing 130 the set of local enhancements into a global enhancement for each image of a stereo image pair comprises creating a best-fit solution based on individual enhancements of each subregion. Because the local enhancement is calculated for each subregion independently, two pixels with the same input pixel value but in different subregions may end up with different pixel values after CLAHE is performed. That is, for each input image pixel value, the resulting CLAHE enhanced pixels may take on many different values due to input pixels being in different subregions. To resolve this issue, isotonic regression is performed to calculate a best fit, monotonically nondecreasing function relating all pixels with the same value in an input image to a single enhanced value. Isotonic regression finds an optimal global solution across all subregions, while preserving the property that if one pixel is not darker than another pixel in the input image, that relationship will still hold in the enhanced image.

In some embodiments, smoothing methods may be applied to an isotonic regression to reduce instances where several pixel values in an input image are mapped to the same enhanced pixel value.

Histogram matching 140 comprises balancing the left and right images in a stereo image pair using cumulative mass functions (CMFs) of the left and right images. The CMF is similar to the histogram, except each bin represents the sum of the number of pixels at or below the bin value. The pixel bin value is normalized based on the total number of pixels in the image, so that the last pixel bin value (255 for an 8 bit image) will have a cumulative mass of 1, since the sum of the number of pixels at or below the last pixel bin value is by definition equal to the total number of pixels in the image. A target CMF is determined by averaging CMFs of the globally enhanced left image and globally enhanced right image. CMFs of the globally enhanced images are then matched to the target CMF by matching the value of a CMF of a globally enhanced image at each particular bin level to the value of the target CMF at the same bin level while maintaining the requirement that all input pixels with the same brightness value be mapped to the same output pixel brightness value.

In some embodiments, the enhancement process 120 and histogram matching 140 may be performed separately for each of a plurality of bands of a stereo image pair. By way of example only and without limiting the scope of the invention, a color image may be separated into three bands, one each for the red, green, and blue bands of the color image. Similarly, multispectral and hyperspectral images may be split into multiple bands based on wavelength or wavelength range. In these embodiments, the enhanced image displayed to a user may be an enhancement of one or more bands.

In some embodiments, one or more of the bands comprising an image may be modified by incorporating information from one or more other bands with similar wavelengths. In these embodiments, the incorporation may be performed using a Gaussian mixture model or using any other appropriate method known in the art.

Calculating 145 the brightness adjustment comprises performing gamma adjustment in order to set the median brightness of an image. To accomplish this, the invention first calculates a gamma value according to the equation:

$$\gamma = \frac{\log(B)}{\log\left(\frac{m}{D}\right)}$$

where B is a user-selected constant, D is the bit depth of the image, and m is the median target intensity value, i.e. it is the pixel value corresponding to the $50^{th}$ percentile of the target cumulative mass function. In some embodiments, B may range from 0.2 to 0.25, although alternative embodiments may use values from 0.1 to 0.5.

Pixel values of the left and right images are then adjusted by the same equation:

$$O = D * \left(\frac{I}{D}\right)^{\gamma}$$

where O is the resulting output image, I is the input image, D is the bit depth, and $\gamma$ is the parameter calculated in the previous equation.

In some embodiments, a brightness term may be added to the image values, in addition to or instead of the gamma adjustment, to achieve the desired median target intensity value. The brightness term is calculated according to the equation:

$$O = I + \delta$$

where $\delta$ is calculated from the equation:

$$\delta = B*D - m$$

where B is the same user-selected constant, D is again the bit depth of the image, and m is the median target intensity value. The resulting values in the output image are clamped such that all values remain within the range of allowable values according to the bit depth of the imagery, that is in the range [0, D−1] where D is the bit depth.

Final enhancement 150 comprises applying enhancement values to appropriate pixels in the left and right images of a stereo image pair. Application can be performed by mapping input image pixels to enhanced values, or using any other appropriate technique known in the art.

In some embodiments, a stereo image pair is one of a series of stereo image pairs, as in a video. In these embodiments, in order to reduce processing time, the steps above may be applied to some or all of the pixels in a given stereo image pair. Change detection techniques, as known in the art, may be used to identify pixels that have changed from a prior stereo image pair. The enhancement process 120, stereo matching 135 and final enhancement 150 may then be performed on the changed pixels and/or the regions surrounding the changed pixels. In addition, or in the alternative, the enhancement process 120, stereo matching 135 and final enhancement 150 may be performed on a subset of the stereo image pairs in the series. The subset may comprise every nth image in the series, only those stereo image pairs where the number of changed pixels exceeds some threshold value, or any combination of these or any other appropriate techniques known in the art.

In embodiments where an enhanced stereo image pair is displayed 155 to a user, the display may be any of: an active stereo 3D display; a passive 3D stereo display; a projector-based system; a mirror-based system; an autostereoscopic display; an augmented reality display, including augmented reality glasses or other heads-up style display; any other appropriate type of display known in the art; or any combination of the foregoing.

The embodiments described above may be implemented using any form of appropriate computing-based device.

Figure 3:
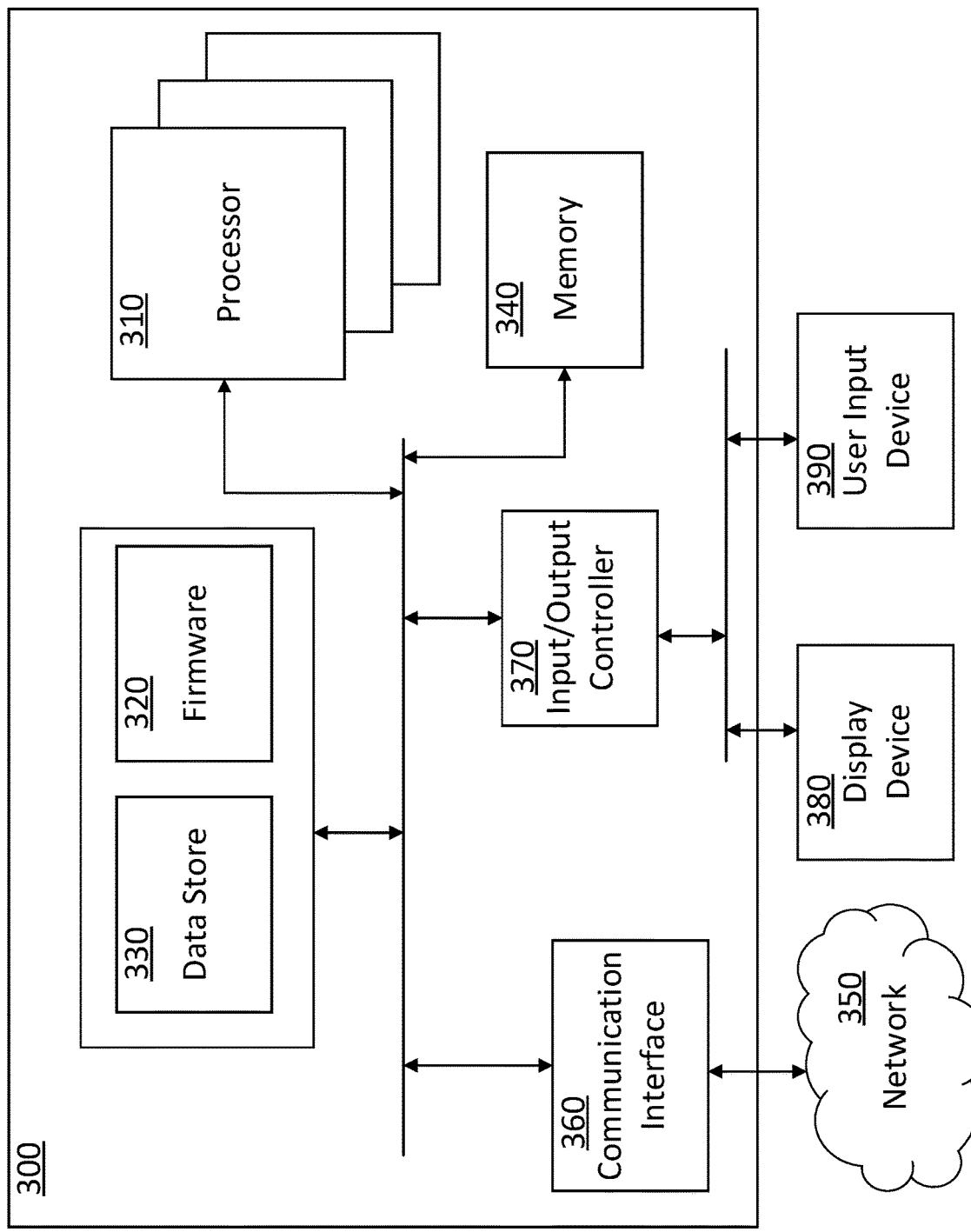
FIG. 3 is an illustration of an exemplary computing-based device.

FIG. 3 illustrates various components of an exemplary computing-based device 300 which may be implemented as any form of a computing and/or electronic device, and in which embodiments of a controller may be implemented.

Computing-based device 300 comprises one or more processors 310 which may be microprocessors, controllers or any other suitable type of processors for processing computer executable instructions to control the operation of the device. In some examples, for example where a system on a chip architecture is used, the processors 310 may include one or more fixed function blocks (also referred to as accelerators) which implement a part of controlling one or more embodiments discussed above. Firmware 320 or an operating system or any other suitable platform software may be provided at the computing-based device 300. Data store 330 is available to store sensor data, parameters, logging regimes, and other data.

The computer executable instructions may be provided using any computer-readable media that is accessible by computing based device 300. Computer-readable media may include, for example, computer storage media such as memory 340 and communications media. Computer storage media, such as memory 340, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but signals per se, propagated or otherwise, are not examples of computer storage media. Although the computer storage media (memory 340) is shown within the computing-based device 300 it will be appreciated that the storage may be distributed or located remotely and accessed via a network 350 or other communication link (e.g. using communication interface 360).

The computing-based device 300 also comprises an input/output controller 370 arranged to output display information to a display device 380 which may be separate from or integral to the computing-based device 300. The display information may provide a graphical user interface. The input/output controller 370 is also arranged to receive and process input from one or more devices, such as a user input device 390 (e.g. a mouse, keyboard, camera, microphone, or other sensor). In some examples the user input device 390 may detect voice input, user gestures or other user actions and may provide a natural user interface. This user input may be used to change parameter settings, view logged data, access control data from the device such as battery status and for other control of the device. In an embodiment the display device 380 may also act as the user input device 390 if it is a touch sensitive display device. The input/output controller 370 may also output data to devices other than the display device, e.g. a locally connected or network-accessible printing device. The input/output controller 370 may also connect to various sensors discussed above, and may connect to these sensors directly or through the network 350.

The input/output controller 370, display device 380 and optionally the user input device 390 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments and/or combine any number of the disclosed embodiments without departing from the spirit or scope of this specification.

The invention claimed is:

1. A method for enhancing stereo image pairs comprising:
reprojecting a pair of images into a common coordinate system;
after reprojecting, masking portions of either image that are not common to both images;
after masking, calculating a plurality of local enhancement values for each image of the pair;
converting the local enhancement values into global enhancement values for each image of the pair;
balancing the two images of the pair;
calculating at least one brightness adjustment for the image pair; and
mapping the global enhancement, balancing, and brightness adjustment values to the images of the pair.

2. The method of claim 1, wherein the two images of the pair are captured at different times.

3. The method of claim 1, wherein the reprojection comprises using rational polynomial coefficients and elevation data to project the image pair in a common coordinate system onto a topographic surface of the earth.

4. The method of claim 1, wherein reprojection is performed using orthorectified images.

5. The method of claim 1, wherein calculating the plurality of local enhancement values comprises limiting contrast by normalizing the variance of each image.

6. The method of claim 1, wherein balancing the two images comprises:
calculating a cumulative mass function of a globally enhanced left image of the image pair;
calculating a cumulative mass function of a globally enhanced right image of the image pair;
calculating a target cumulative mass function, wherein the target cumulative mass function is the average of the cumulative mass functions of the globally enhanced left image and the globally enhanced right image;
matching the values of the cumulative mass functions of the globally enhanced left image and globally enhanced right image at a plurality of bin levels to values of the target cumulative mass function at the plurality of bin levels.

7. The method of claim 1, wherein calculating at least one brightness adjustment for the image pair comprises calculating a gamma value, the gamma value being a function of a bit depth of an image of the image pair, a median target brightness intensity value, and a constant.

8. The method of claim 1, wherein calculating at least one brightness adjustment for the image pair comprises:
calculating a brightness term, the brightness term being a function of a bit depth of an image of the image pair, a median target brightness intensity value, and a constant; and
clamping brightness values such that, after adjustment, all brightness values are within a range of allowable brightness values.

9. A method for enhancing a series of stereo image pairs comprising:
reprojecting a plurality of pairs of images into a common coordinate system; and
for each of the plurality of pairs of images;
masking portions of either image that are not common to both images;
after masking, calculating a plurality of local enhancement values for each image of the pair;
converting the local enhancement values into global enhancement values for each image of the pair;
balancing the two images of the pair;
calculating at least one brightness adjustment for the image pair; and
mapping the global enhancement, balancing, and brightness adjustment values to the images of the pair.

10. The method of claim 9, wherein the reprojection comprises using rational polynomial coefficients and elevation data to project the image pair in a common coordinate system onto a topographic surface of the earth.

11. The method of claim 9, wherein reprojection is performed using orthorectified images.

12. The method of claim 9, wherein calculating the plurality of local enhancement values comprises limiting contrast by normalizing the variance of each image.

13. The method of claim 9, wherein balancing the two images comprises:
calculating a cumulative mass function of a globally enhanced left image of the image pair;
calculating a cumulative mass function of a globally enhanced right image of the image pair;
calculating a target cumulative mass function, wherein the target cumulative mass function is the average of the cumulative mass functions of the globally enhanced left image and the globally enhanced right image;
matching the values of the cumulative mass functions of the globally enhanced left image and globally enhanced right image at a plurality of bin levels to values of the target cumulative mass function at the plurality of bin levels.

14. The method of claim 9, wherein calculating at least one brightness adjustment for the image pair comprises calculating a gamma value, the gamma value being a function of a bit depth of an image of the image pair, a median target brightness intensity value, and a constant.

15. The method of claim 9, wherein calculating at least one brightness adjustment for the image pair comprises:
calculating a brightness term, the brightness term being a function of a bit depth of an image of the image pair, a median target brightness intensity value, and a constant; and
clamping brightness values such that, after adjustment, all brightness values are within a range of allowable brightness values.

16. A method for enhancing a multispectral stereo image pair comprising:
reprojecting each image of the pair of images into a common coordinate system;
after reprojection, masking portions of either image that are not common to both images;
dividing the masked image pair into a plurality of sub-image pairs, the division based at least in part on wavelength range; and
for each sub-image pair:
calculating a plurality of local enhancement values for each sub-image of the pair;
converting the local enhancement values into global enhancement values for each sub-image of the pair;
balancing the two sub-images of the pair;
calculating at least one brightness adjustment for the sub-image pair; and
mapping the global enhancement, balancing, and brightness adjustment values to the sub-images of the pair.

17. The method of claim 16, wherein the reprojection comprises using rational polynomial coefficients and elevation data to project the image pair in a common coordinate system onto a topographic surface of the earth.

18. The method of claim 16, wherein calculating the plurality of local enhancement values comprises limiting contrast by normalizing the variance of each sub-image.

19. The method of claim 16, wherein balancing the two sub-images comprises:
calculating a cumulative mass function of a globally enhanced left sub-image of the sub-image pair;
calculating a cumulative mass function of a globally enhanced right sub-image of the sub-image pair;
calculating a target cumulative mass function, wherein the target cumulative mass function is the average of the cumulative mass functions of the globally enhanced left sub-image and the globally enhanced right sub-image;
matching the values of the cumulative mass functions of the globally enhanced left sub-image and globally enhanced right sub-image at a plurality of bin levels to values of the target cumulative mass function at the plurality of bin levels.

20. The method of claim 16, wherein calculating at least one brightness adjustment for the sub-image pair comprises calculating a gamma value, the gamma value being a function of a bit depth of a sub-image of the sub-image pair, a median target brightness intensity value, and a constant.

* * * * *